(12) United States Patent
Kawamura

(10) Patent No.: US 6,931,838 B2
(45) Date of Patent: Aug. 23, 2005

(54) ENGINE EXHAUST GAS LEAK DIAGNOSIS

(75) Inventor: Katsuhiko Kawamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 130 days.

(21) Appl. No.: 10/322,720

(22) Filed: Dec. 19, 2002

(65) Prior Publication Data

US 2003/0131587 A1 Jul. 17, 2003

(30) Foreign Application Priority Data

Jan. 17, 2002 (JP) ........................................ 2002-008515

(51) Int. Cl.$^7$ .............................................. F01N 3/00
(52) U.S. Cl. .............................. 60/276; 60/274; 60/277; 60/285; 73/23.32
(58) Field of Search ......................... 60/274, 276, 277, 60/285; 73/23.31, 23.32, 118.2; 701/103, 109

(56) References Cited

U.S. PATENT DOCUMENTS

| | | | |
|---|---|---|---|
| 5,351,526 A | * | 10/1994 | Krohm et al. ................. 73/40 |
| 5,398,501 A | * | 3/1995 | Ito et al. ........................ 60/276 |
| 5,529,043 A | | 6/1996 | Nagaishi et al. |
| 5,617,722 A | * | 4/1997 | Takaku ........................ 60/277 |
| 6,594,987 B2 | * | 7/2003 | Uranishi ....................... 60/277 |
| 6,684,869 B2 | * | 2/2004 | Ponagai et al. ............. 123/680 |

FOREIGN PATENT DOCUMENTS

JP          3075079 B2     6/2000

* cited by examiner

*Primary Examiner*—Tu M. Nguyen
(74) *Attorney, Agent, or Firm*—Foley & Lardner LLP

(57) ABSTRACT

Oxygen sensors (3, 13) are provided upstream and downstream of a three-way catalytic converter (10) in an exhaust passage (9) of an internal combustion engine (1). A controller (2) performs feedback correction of an air-fuel ratio of an air-fuel mixture burnt in the engine (1) by proportional/integral control based on the output of the upstream oxygen sensor (3). In this process, the controller (2) corrects a proportional part by a correction value based on the output of the downstream oxygen sensor (13) (S11, S12). The feedback correction is performed based on a feedback correction coefficient calculated using the proportional part and an integral part. The controller (2) further determines if there is a leak in the exhaust passage (9) based on the correction value (S61) (S62). Higher diagnostic precision is obtained than in the case where the determination is performed based directly on the feedback correction coefficient.

10 Claims, 8 Drawing Sheets

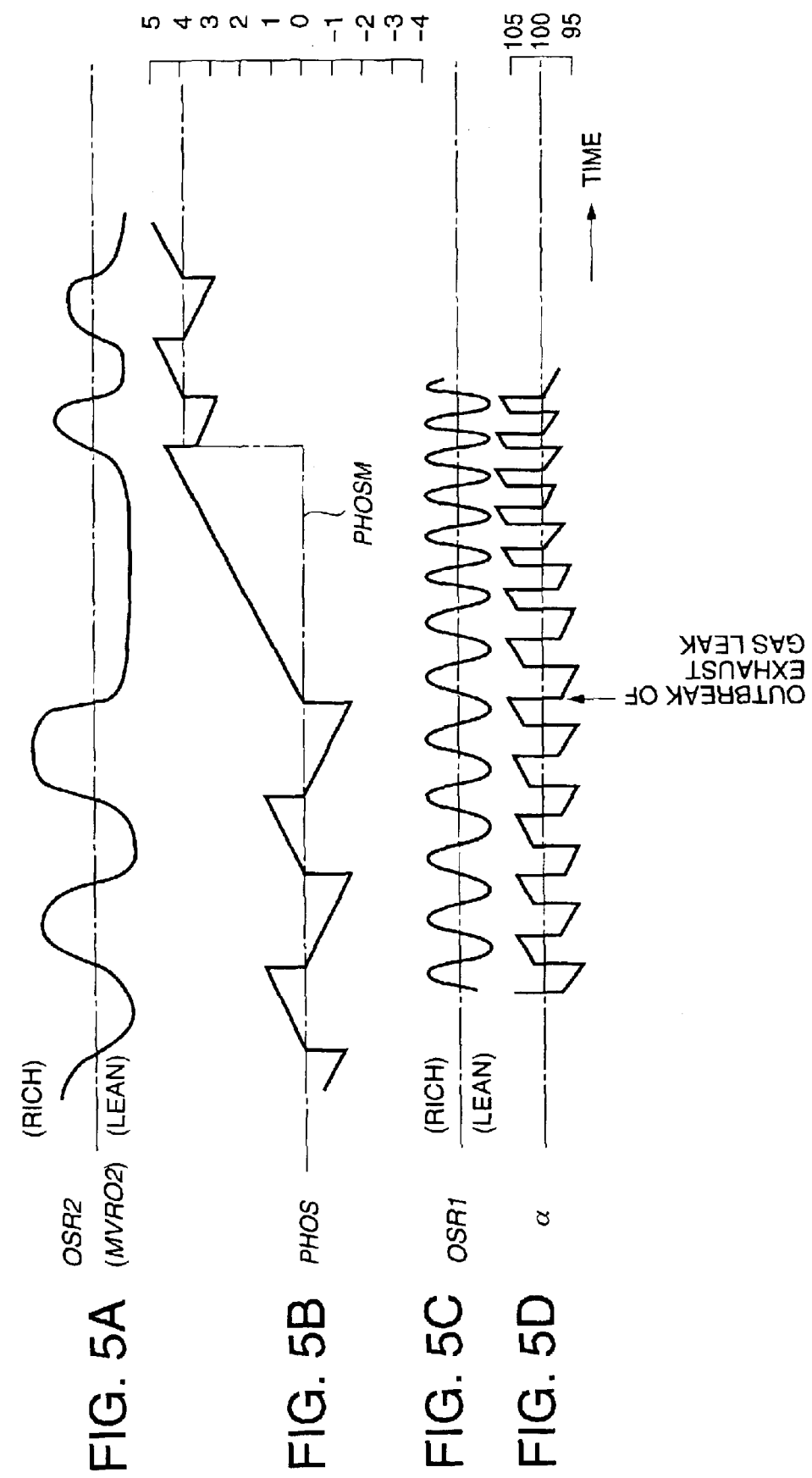

ENGINE EXHAUST GAS LEAK DIAGNOSIS

FIELD OF THE INVENTION

This invention relates to diagnosis of exhaust gas leaks from an exhaust passage leading from an internal combustion engine to an exhaust gas purification catalyst

BACKGROUND OF THE INVENTION

Nitrogen oxides (NOx), hydrocarbons (HC) and carbon monoxide (CO) which are the three toxic components of engine exhaust gas, are efficiently purified by installing a three-way catalyst in the exhaust passage.

However, if there is a leak in the exhaust passage leading from the engine to the catalyst, the toxic components are discharged into the atmosphere without being purified.

Japanese Patent No. 3075079 published by the Japanese Patent Office on Jun. 9, 2002, discloses a technique for diagnosing the presence of a leak in this exhaust passage. This prior art technique is applied to an air-fuel ratio feedback control device which feedback controls the air-fuel ratio of the gaseous mixture burnt by the engine based on the output of an oxygen sensor which detects the oxygen concentration in the exhaust gas. The prior art technique learns an air-fuel ratio feedback correction coefficient respectively for a low load region and a high load region and determines the presence or absence of an exhaust gas leak by comparing the two learned values.

SUMMARY OF THE INVENTION

If there is a leak in the exhaust passage, atmospheric air enters the exhaust passage from the leak position due to the exhaust gas pulsation of the engine. In the low load region where engine pulsation is large, atmospheric air easily enters the exhaust passage from the leak position due to the pulsation. Also, in the low load region, the exhaust gas flowrate in the exhaust passage is small, so the entry of atmospheric air has a large effect on the exhaust gas composition.

On the other hand, in the high load region, the exhaust gas flowrate is large, so even if the same volume of atmospheric air as in the low load region enters the exhaust passage, there is not much effect on the exhaust gas composition.

In this regard, according to the prior art technique, when the value of the air-fuel ratio learned in the low load region based on the oxygen sensor output is larger than the air-fuel ratio value learned in the high load region based on the oxygen sensor output, it is determined that there is an exhaust gas leak. However, as the variation of the air-fuel ratio learned value due to the leak is small, according to the prior art technique, high precision diagnosis of exhaust gas leaks cannot be expected.

It is therefore an object of this invention to improve the diagnostic precision of exhaust gas leaks in an exhaust passage between an engine and a catalyst.

In order to achieve the above object, this invention provides an air-fuel ratio control device for such an internal combustion engine that burns an air-fuel mixture of air and fuel injected from a fuel injector and discharges combustion gas from an exhaust passage through a three-way catalytic converter. The device comprises an upstream oxygen sensor which detects an oxygen concentration of the exhaust passage upstream of the three-way catalytic converter, a downstream oxygen sensor which detects an oxygen concentration of the exhaust passage downstream of the three-way catalytic converter, and a controller.

The controller is functioning to calculate a correction value based on the oxygen concentration detected by the downstream oxygen sensor, correct a preset basic control constant by the correction value, feedback control a fuel injection amount of the fuel injector based on the oxygen concentration detected by the upstream oxygen sensor and the corrected basic control constant to cause an air-fuel ratio of the air-fuel mixture to be equal to a stoichiometric air-fuel ratio, and determine whether or not there is an exhaust gas leak in the exhaust passage upstream of the three-way catalytic converter based on the correction value.

This invention also provides an air-fuel ratio control method for the internal combustion engine described above. The method comprises detecting an oxygen concentration of the exhaust passage upstream of the three-way catalytic converter, detecting an oxygen concentration of the exhaust passage downstream of the three-way catalytic converter, calculating a correction value based on the oxygen concentration of the exhaust passage downstream of the three-way catalytic converter, correcting a preset basic control constant by the correction value, feedback controlling a fuel injection amount of the fuel injector based on the oxygen concentration of the exhaust passage upstream of the three-way catalytic converter and the corrected basic control constant to cause an air-fuel ratio of the air-fuel mixture to be equal to a stoichiometric air-fuel ratio, and determining whether or not there is an exhaust gas leak in the exhaust passage upstream of the three-way catalytic converter based on the correction value.

The details as well as other features and advantages of this invention are set forth in the remainder of the specification and are shown in the accompanying drawings.

BRIEF DESCRIPTION OF THE DRAWINGS

FIGS. 5A–5D are diagrams describing correlation relationships between an upstream oxygen sensor output signal OSR1, downstream oxygen sensor output signal OSR2, air-fuel ratio feedback correction coefficient α and the proportional part correction value PHOS calculated by the controller.

DESCRIPTION OF THE PREFERRED EMBODIMENTS

Figure 1:
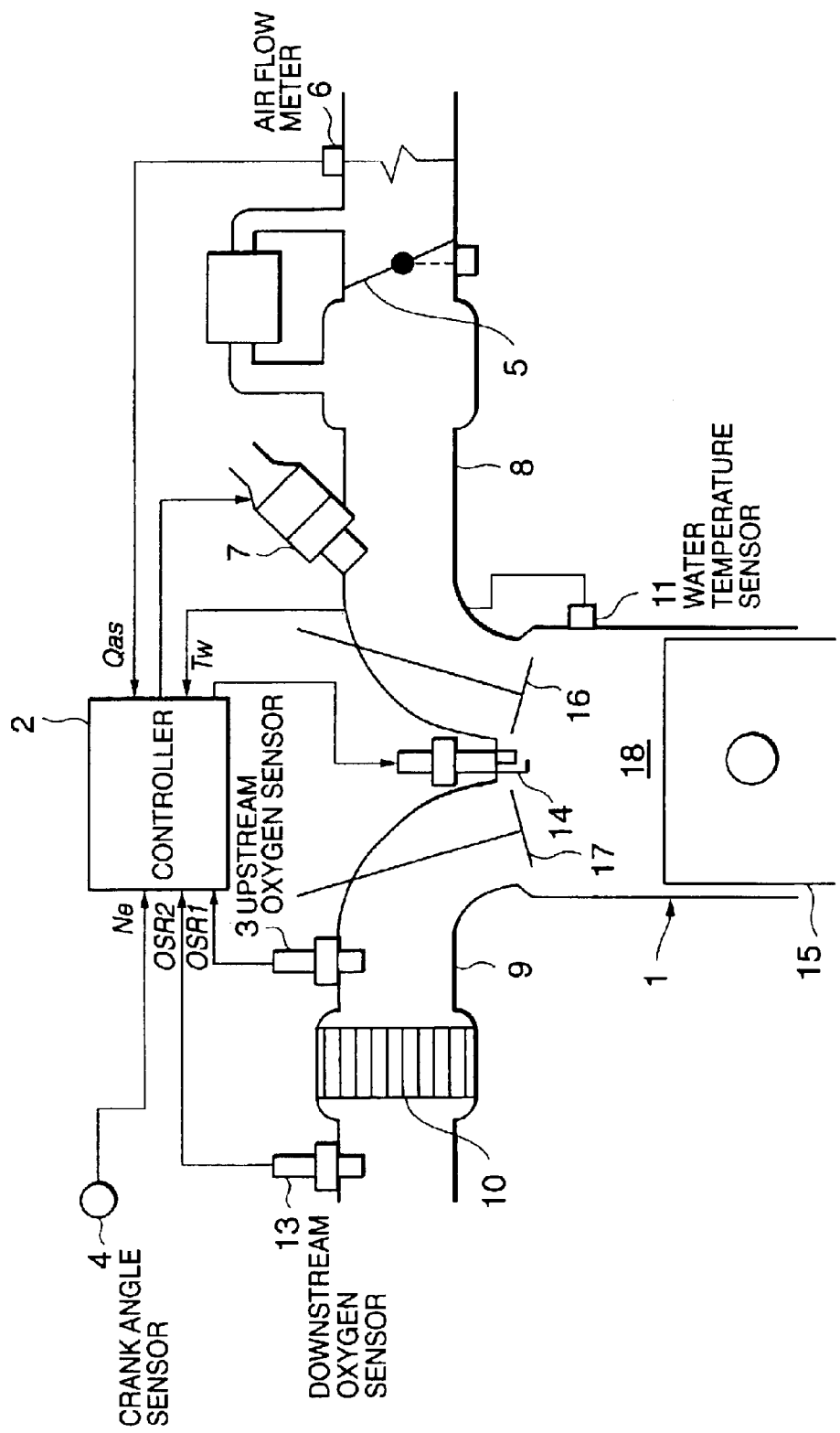
FIG. 1 is a schematic diagram of an air-fuel ratio feedback control device of an engine to which this invention is applied.

Referring to FIG. 1 of the drawings, in a reciprocal internal combustion engine 1 installed in a vehicle, air is aspirated into a combustion chamber 18 from an intake passage 8 and an intake valve 16, fuel is injected into this aspirated air from a fuel injector 7, and the gaseous mixture produced in a combustion chamber 18 is burnt which causes the reciprocal motion of a piston 15.

The gaseous mixture in the combustion chamber 18 is burnt due to the ignition of a spark plug 14. The intake air flowrate of the intake passage 8 is adjusted by a throttle 5 operating according to a depression amount of an accelerator pedal with which the vehicle is provided.

The burnt gas in the combustion chamber 18 is discharged into an exhaust passage 9 as exhaust gas via an exhaust valve 17. A three-way catalytic converter 10 is installed midway in the exhaust passage 9. The three-way catalytic converter 10 purifies toxic substances in the exhaust gas by reducing nitrogen oxides (NOx) in the exhaust gas and oxidizing carbon monoxide (CO) and hydrocarbons (HC) in the exhaust gas.

The three-way catalytic converter 10 achieves the maximum purification performance when the air-fuel ratio of the gaseous mixture burnt in the combustion chamber 18 periodically fluctuates within a predetermined window around the stoichiometric air-fuel ratio. To achieve this air-fuel ratio environment, a controller 2 controls the fuel injection amount of the fuel injector 7.

The controller 2 is a microcomputer comprising a central processing unit (CPU), read-only memory (ROM), random access memory (RAM) and input/output interface (I/O interface). The controller may also comprise plural microcomputers.

The controller 2 controls the fuel injection amount of the fuel injector 7 by outputting a pulse signal to the fuel injector 7. An ignition timing of the spark plug 14 is also controlled by an ignition signal output from the controller 7.

To control the fuel injection amount of the fuel injector 7, an air flow meter 6 which detects an intake air flowrate Qas of the intake passage 8, a crank angle sensor 4 which outputs a Ref signal according to a predetermined rotation position of the engine 1 and detects a rotation speed Ne of the engine 1, a water temperature sensor 11 which detects a cooling water temperature Tw of the engine 1, an upstream oxygen sensor 3 which detects an oxygen concentration of the exhaust gas in the exhaust passage 9 upstream of the three-way catalytic converter 10, and a downstream oxygen sensor 13 which detects an oxygen concentration of the exhaust gas in the exhaust passage 9 downstream of the three-way catalytic converter 10, are provided. The detection data from these sensors are input to the controller 2 as signals.

The controller 2 calculates a basic fuel injection pulse width Tp based on the intake air flowrate Qas of the intake passage 8 and the engine rotation speed Ne. The calculation of the basic fuel injection pulse width Tp is known from U.S. Pat. No. 5,529,043.

The controller 2 outputs a pulse signal to the fuel injector 7 according to the basic fuel injection pulse width Tp, and feedback controls the pulse width of the pulse signal based on the oxygen concentration of the exhaust gas detected by the upstream oxygen sensor 3 by applying a well known proportional/integral control method so that the gaseous mixture produced in the combustion chamber 18 lies within a predetermined window centered on the stoichiometric air-fuel ratio. Further, a proportional part of a feedback correction amount, or proportional/integral correction amount in other words, applied to this feedback control is corrected according to the oxygen concentration of the exhaust gas detected by the downstream oxygen sensor 13.

Next, a routine for calculating the air-fuel ratio feedback correction coefficient $\alpha$ executed by the controller 2 will be described referring to FIG. 2. The fuel injection amount of the fuel injector 7, i.e., the pulse width of the pulse signal output by the controller 2 to the fuel injector 7, is increased or decreased according to this air-fuel ratio feedback correction coefficient $\alpha$. The calculation of the air-fuel ratio feedback correction coefficient $\alpha$ is based on proportional/integral control as described above.

This routine is executed in synchronism with the Ref signal output by the crank angle sensor 4 during operation of the engine 1. The Ref signal is output at a predetermined rotation position of the engine 1. The fuel injection of the fuel injector 7 is performed in synchronism with the Ref signal of the engine 1, and as fluctuation of the control system occurs in synchronism with the Ref signal, feedback control of the air-fuel ratio is also performed in synchronism with the Ref signal.

First, in a step S1, the controller 2 determines whether or not air-fuel ratio feedback control conditions are satisfied.

Air-fuel ratio feedback control conditions are determined to be the following.

i. The cooling water temperature Tw exceeds a predetermined temperature.

ii. The upstream oxygen sensor 3 is activated.

iii. The load of the engine 1 is below a predetermined load.

iv. The upstream oxygen sensor 3 and downstream oxygen sensor 13 do not have a fault.

If any of the above conditions i.–iv. Is not satisfied, the controller 2 determines that air-fuel ratio feedback control conditions are not satisfied, and in a step S2, after clamping the air-fuel ratio feedback correction coefficient $\alpha$ to 1.0, it terminates the routine.

If all of the conditions i.–iv. are satisfied, the controller 2 determines that air-fuel ratio feedback conditions are satisfied, and proceeds to a step S3 and subsequent steps.

In the step S3, the controller 2 performs analog/digital conversion on an output signal OSR1 of the upstream oxygen sensor 3, and reads the signal. As the output signal OSR1 is a voltage signal, the units are millivolts (mV).

In a next step S4, the controller 2 compares the output signal OSR1 with a slice level SLF. This slice level SLF is a value for determining whether or not the air-fuel ratio of the gaseous mixture burnt in the combustion chamber 18 is rich or lean compared to the stoichiometric air-fuel ratio. SLF is herein set to 500 mV. If the output signal OSR1 is larger than SLF, it is determined that the fuel ratio is rich, and if the output signal OSR1 is smaller than SLF, it is determined that the air-fuel ratio is lean.

In the step S4, if OSR1 is larger than SLF, i.e., if the air-fuel ratio is rich, the controller 2 sets a flag AFF1 to unity in step S5. In the step S4, if OSR1 is not larger than SLF, i.e., if the air-fuel ratio is lean, the controller resets AFF1 to zero in step S6.

If OSR1 is equal to SLF, i.e., in the case of the stoichiometric air-fuel ratio, it will be assumed here for convenience that the air-fuel ratio is lean. The initial value of the flag AFF1 is zero.

After the processing of a step S5 or S6, the controller 2, in a step S7, reads a flag AFF0. The flag AFF0 shows the value of the flag AFF1 set on the immediately preceding occasion the routine was executed. As described hereafter, the flag AFF0 is set at the end of the routine. The initial value of the flag AFF0 is also zero.

In a next step S8, the controller 2 determines whether or not the value of the flag AFF0 is different from the value of the flag AFF1.

If the value of the flag AFF0 is different from the value of the flag AFF1, it shows that the air-fuel ratio has changed from rich to lean, or from lean to rich, during the time from when the routine was executed on the immediately preceding occasion to the present execution of the routine. In this case, in a step S9, the controller 2 executes a subroutine shown in FIG. 3, and calculates a proportional part correction value PHOS.

If the value of the flag AFF0 is equal to the value of the flag AFF1, it shows that the air-fuel ratio has continued to be rich or lean during the time from when the routine was executed on the immediately preceding occasion to the present execution of the routine. In this case, in a step S13, the controller 2 determines whether or not the flag AFF1 is zero.

If the flag AFF1 is zero, i.e., if the air-fuel ratio is lean, the controller 2, in a step S14, determines the air-fuel ratio feedback correction coefficient α from the following equation (1):

$$\alpha = \alpha_{n-1} + IL \quad (1)$$

where, $\alpha_{n-1}$=α calculated on the immediately preceding occasion the routine was executed, and
IL=integral part of proportional/integral correction amount of the lean air-fuel ratio.

The processing of the step S14 is performed when the air-fuel ratio continues to be lean. In this case, the air-fuel ratio is guided towards rich by increasing the air-fuel ratio feedback correction coefficient α with an increment equal to the integral part IL.

In the step S13, when the flag AFF1 is not zero, i.e., when the air-fuel ratio is rich, the controller 2, in a step S15, determines the fuel ratio feedback correction coefficient α from the following equation (2):

$$\alpha = \alpha_{n-1} - IR \quad (2)$$

where, IR=integral part of proportional/integral correction amount of the rich air-fuel ratio.

The processing of the step S15 is performed when the air-fuel ratio continues to be rich. In this case, the air-fuel ratio is guided towards lean by decreasing the air-fuel ratio feedback correction coefficient α with a decrement equal to the integral part IR.

The integral parts IR, IL have the same fixed values.

Next, referring to FIG. 3, the subroutine performed in the step S9 will be described. As described earlier, this subroutine is executed when the air-fuel ratio has changed from rich to lean or from lean to rich. If the air-fuel ratio has shown such a change, the air-fuel ratio feedback correction coefficient α is updated by applying a proportional part PR or PL of the proportional/integral correction amount.

The proportional parts PR, PL are equal fixed values, but when the air-fuel ratio feedback correction coefficient α is updated using the proportional parts PR, PL, the correction value PHOS is also applied according to the status of the air-fuel ratio variation. The subroutine of FIG. 3 is a subroutine for calculating the proportional part correction value PHOS. The calculation of the proportional part correction value PHOS is also based on proportional/integral control.

In this subroutine, first, in a step S21, the controller 2 reads a smoothed signal MVRO2 based on an output voltage OSR2 of the downstream oxygen sensor 13.

Figure 4:
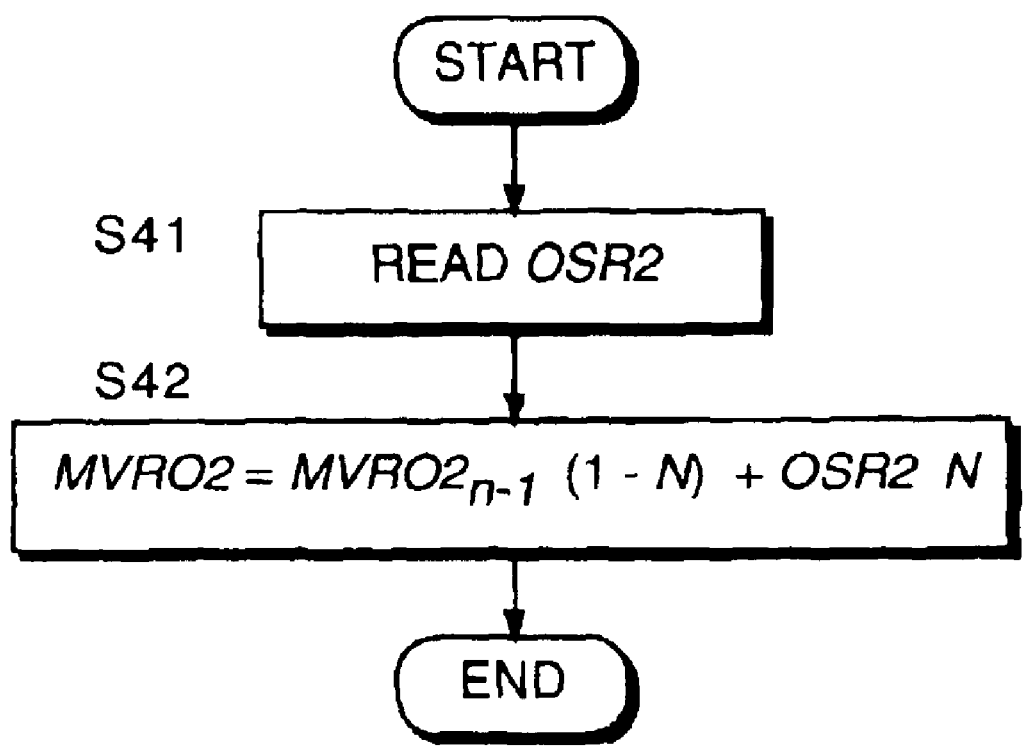
FIG. 4 is a flowchart describing a routine for calculating a smoothed output voltage MVRO2 of a downstream oxygen sensor performed by the controller.

Here the smoothed signal MVRO2 is generated by a routine shown in FIG. 4.

Figure 2:
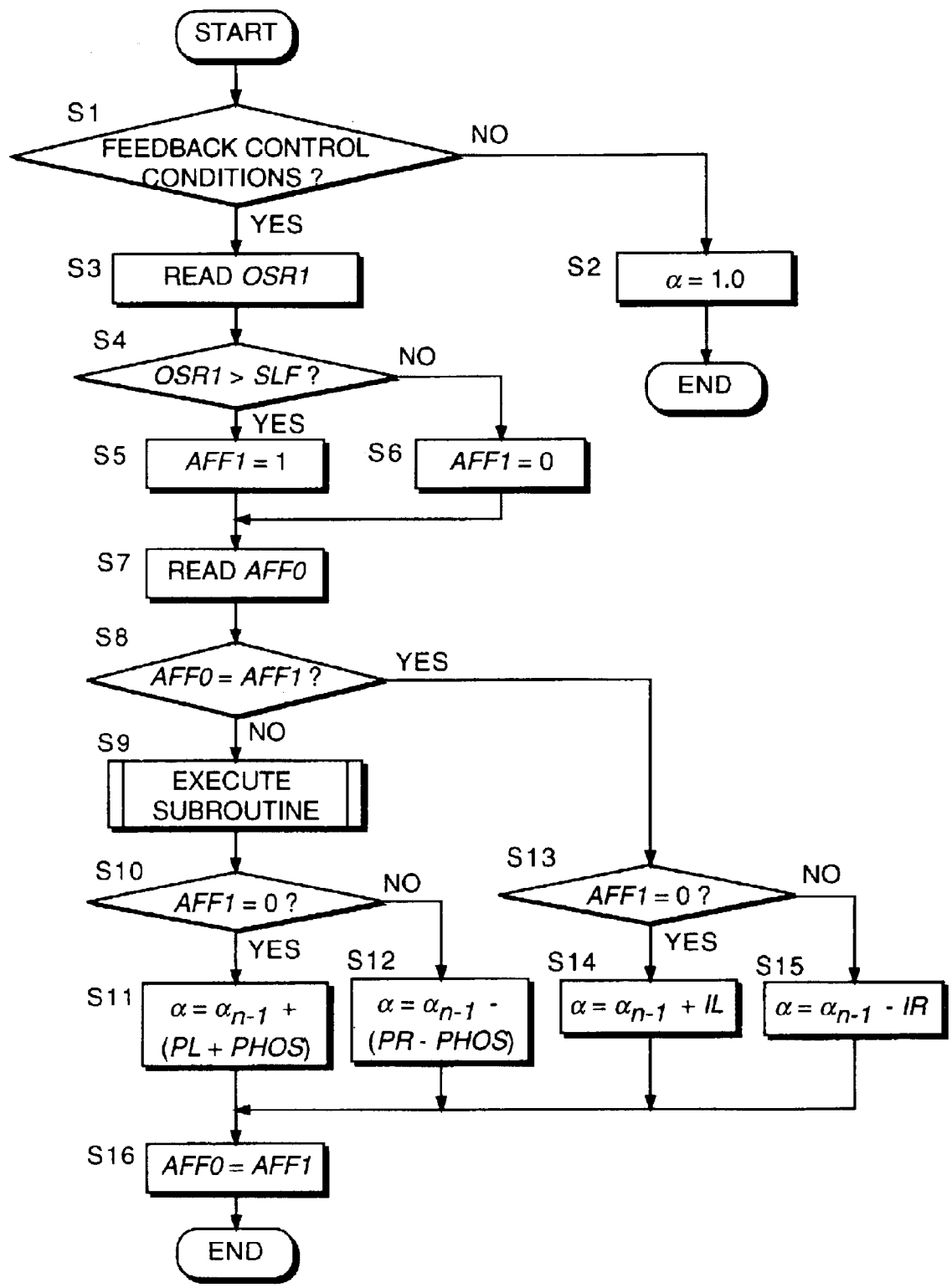
FIG. 2 is a flowchart describing a routine for calculating an air-fuel ratio feedback correction coefficient α performed by a controller according to this invention.

The routine of FIG. 4 is performed independently from the routine of FIG. 2 by the controller 2, once on each occasion that the engine 1 makes one rotation.

Referring to FIG. 4, the controller 2, first in a step S41, performs analog/digital conversion of the output voltage OSR2 of the downstream oxygen sensor 13, and then reads the voltage. In a next step S42, the smoothing shown by the following equation (3) is performed on the output voltage OSR2.

$$MVRO2 = MVRO2_{n-1} \cdot (1-N) + OSR2 \cdot N \quad (3)$$

where, $MVRO2_{n-1}$=MVRO2 calculated on the immediately preceding occasion the routine was executed, and
N=smoothing constant<1.

When the routine is first performed immediately following startup of the engine 1, the output voltage OSR2 of the downstream oxygen sensor 13 is used without modification as the initial value of the smoothed signal MVRO2.

Referring again to FIG. 3, in a step S22, the controller 2 compares the smoothed signal MVRO2 with a slice level SLR. The slice level SLR is herein set to 500 mV.

If the smoothed signal MVRO2 is larger than the slice level SLF, it means that the oxygen concentration of the exhaust gas is low. In this case, in a step S23, the controller 2 resets the flag AFR1 to unity. If the smoothed signal MVRO2 is not larger than the slice level SLF, it means that the oxygen concentration is high.

In this case, in a step S24, the controller 2 resets the flag AFR1 to zero. The flag AFR1 is a flag showing whether the oxygen concentration of the exhaust gas flowing out of the three-way catalytic converter 10 corresponds to the oxygen concentration of the burnt gas from a rich air-fuel mixture, or corresponds to the oxygen concentration of the burnt gas from a lean air-fuel mixture, and its initial value is zero.

After the processing of the step S23 or 24, in a step S25, the controller 2 reads the flag AFR0. The flag AFR0 shows the value of the flag AFR1 on the immediately preceding occasion when the routine was executed. The initial value of the flag AFR0 is also zero.

In a following step S26, the controller 2 determines whether or not the value of the flag AFR0 is different from the value of the flag AFR1. If the value of the flag AFR0 is equal to the value of the flag AFR1, it means that the state where the oxygen concentration of the exhaust gas flowing from the three-way catalytic converter 10 corresponds to the oxygen concentration of the burnt gas from a rich air-fuel mixture, or the state where it corresponds to the oxygen concentration of the burnt gas from a lean air-fuel mixture, is continuing. In this case, the controller 2, in a step S33, determines whether or not the flag AFR1 is zero.

If the flag AFR1 is zero, i.e., if the oxygen concentration of the exhaust gas discharged from the three-way catalytic converter 10 is an oxygen concentration corresponding to a lean air-fuel ratio, in a step S34, the controller 2 updates the proportional part correction value PHOS by the following equation (4):

$$PHOS = PHOS_{n-1} + DPHOSL \quad (4)$$

where, $PHOS_{n-1}$=PHOS calculated on the immediately preceding occasion the routine was executed, and
DPHOSL=integral part of proportional/integral correction amount in oxygen concentration corresponding to a lean air-fuel ratio.

The processing of the step S34 is the case where the oxygen concentration of the exhaust gas discharged from the three-way catalytic converter 10 continues to be an oxygen concentration corresponding to a lean air-fuel ratio. In this case, the proportional part correction value PHOS is increased by an increment equal to the integral part DPHOSL.

If the flag AFR1 is not zero in the step S33, i.e., if the oxygen concentration of the exhaust gas discharged from the three-way catalytic converter 10 is an oxygen concentration corresponding to a rich air-fuel ratio, in a step S35, the controller 2 updates the proportional part correction value PHOS by the following equation (5):

$$PHOS = PHOS_{n-1} - DPHOSR \quad (5)$$

where, DPHOSR=integral part of proportional/integral correction amount in oxygen concentration corresponding to a rich air-fuel ratio.

The processing of the step S35 is performed when the oxygen concentration of the exhaust gas discharged from the three-way catalytic converter 10 continues to be an oxygen concentration corresponding to a rich air-fuel ratio. In this case, the proportional part correction value PHOS is decreased by a decrement equal to the integral part DPHOSR.

The integral parts DPHOSL, DPHOSR are both fixed values.

When the value of the flag AFR0 is different from the value of the flag AFR1 in the step S26, i.e., when the oxygen concentration of the exhaust gas discharged from the three-way catalytic converter 10 changes from an oxygen concentration corresponding to a rich air-fuel ratio, to an oxygen concentration corresponding to a lean air-fuel ratio, or vice versa, the controller 2 determines, in a step S27, whether or not the flag AFR1 is zero.

If the flag AFR1 is not zero, i.e., if the oxygen concentration of the exhaust gas discharged from the three-way catalytic converter 10 has changed from an oxygen concentration corresponding to a lean air-fuel ratio to an oxygen concentration corresponding to a rich air-fuel ratio, the controller 2, in a step S31, stores the proportional part correction value PHOS as a positive peak value PHOSR. When the oxygen concentration of the exhaust gas discharged from the three-way catalytic converter 10 continues to be an oxygen concentration corresponding to a lean air-fuel ratio, in the step S34, the proportional part correction value PHOS increases by the increment equal to the integral part DPHOSL as described above.

Therefore, when the oxygen concentration of the exhaust gas discharged from the three-way catalytic converter 10 has changed from an oxygen concentration corresponding to a lean air-fuel ratio, to an oxygen concentration corresponding to a rich air-fuel ratio, the proportional part correction value PHOS has the largest value. In the step S31, this value is stored as the positive peak value PHOSR.

In a following step S32, the controller 2 updates the proportional part correction value PHOS by the following equation (6):

$$PHOS = PHOS_{n-1} - PHPR \quad (6)$$

where, PHPR=proportional part of proportional/integral correction amount in oxygen concentration corresponding to a rich air-fuel ratio.

On the other hand, when the flag AFR1 is zero in the step S26, i.e., when the oxygen concentration of the exhaust gas discharged from three-way catalytic converter 10 has changed from an oxygen concentration corresponding to a rich air-fuel ratio, to an oxygen concentration corresponding to a lean air-fuel ratio, in a step S28, the controller 2 calculates a mean value PHOSM by the following equation (7):

$$PHOSM = (PHOS + PHOSR)/2 \quad (7)$$

If the oxygen concentration of the exhaust gas discharged from the three-way catalyst 10 continues to be an oxygen concentration corresponding to a rich air-fuel ratio, in the step S35, the proportional part correction value PHOS is decreased by the decrement DPHOSR as described above. Therefore, the proportional part correction value PHOS immediately after the oxygen concentration of the exhaust gas discharged from the three-way catalyst 10 has changed from an oxygen concentration corresponding to a lean air-fuel ratio, to an oxygen concentration corresponding to a rich air-fuel ratio, has the smallest value. This value is termed a negative peak value.

In the step S28, the mean value PHOSM of the proportional part correction value PHOS corresponding to this negative peak value and the positive peak value PHOSR stored in the step S31 is calculated.

In a next step S29, the controller 2 calculates a learning value PHOSA of the proportional part correction value by the following equation (8).

$$PHOSA = mPHOSM + (1-m)PHOSA_{n-1} \quad (8)$$

where, $PHOSA_{n-1}$=PHOSA calculated on immediately preceding occasion when the step S28 was executed, and m=weighted average coefficient <1.

The learning value PHOSA is stored in the memory of the controller 2. In a state where feedback control of the air-fuel ratio has once been terminated, and is subsequently re-started, in the first step executed from among the steps S30, S32, S34, S35, the learning value PHOSA is used as the initial value of $PHOS_{n-1}$.

In the following step S30, the controller 2 updates the proportional part correction value PHOS by the following equation (9).

$$PHOS = PHOS_{n-1} + PHPL \quad (9)$$

where, PHPL=proportional part of proportional/integral correction amount at the oxygen concentration corresponding to a lean air-fuel ratio.

The proportional parts PHPR, PHPL are both fixed values.

After the proportional part correction value PHOS is calculated in the step S30, S32, S34 or S35, the controller 2 shifts the value of the flag AFR1 into the flag AFR0 in a step S36.

After the processing of the step S36, the controller 2 terminates the subroutine.

Figure 3:
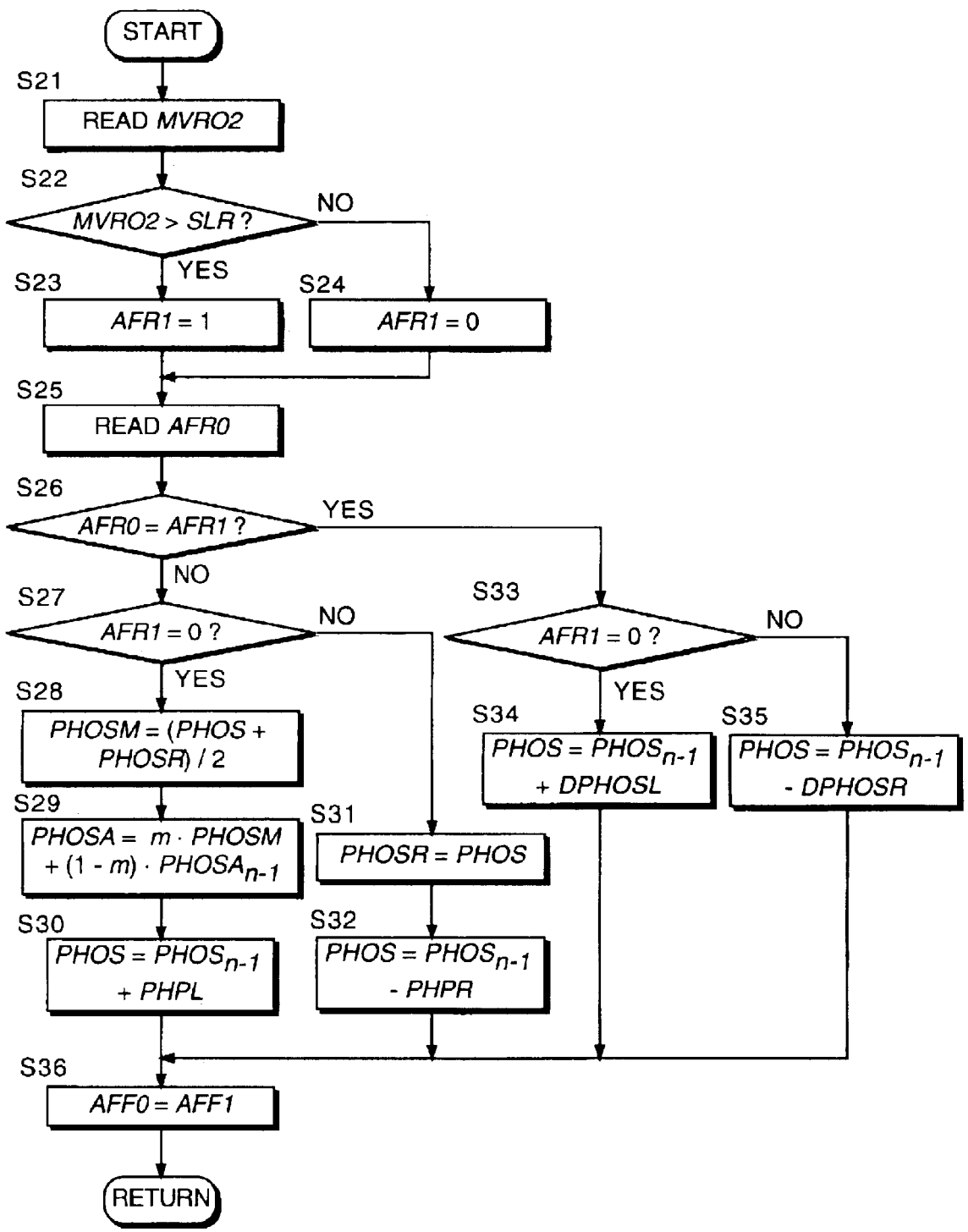
FIG. 3 is a flowchart describing a subroutine for calculating a proportional part correction value PHOS performed by the controller in the routine of FIG. 2.

Referring to FIGS. 5A, 5B, when the controller 2 updates the proportional part correction value PHOS by the subroutine of FIG. 3, if the smoothed signal MVRO2 shows an oxygen concentration corresponding to a lean air-fuel ratio, it gradually increases the proportional part correction value PHOS, and if the smoothed signal MVRO2 shows an oxygen concentration corresponding to a rich air-fuel ratio, it gradually decreases the proportional part correction value PHOS. Also, when an oxygen concentration corresponding to a lean air-fuel ratio changes to an oxygen concentration corresponding to a rich air-fuel ratio, the proportional part correction value PHOS sharply decreases, and when an oxygen concentration corresponding to a rich air-fuel ratio changes to an oxygen concentration corresponding to a lean air-fuel ratio, the proportional part correction value PHOS sharply increases.

Now, referring again to FIG. 2, after the subroutine of FIG. 3 is executed in the step S9, in a step S10, the controller 2 determines whether or not the flag AFF1 is zero. If the flag AFF1 is zero, it shows that the air-fuel ratio has just changed from rich to lean. In this case, the controller 2, in a step S11, determines the air-fuel ratio feedback correction coefficient α from the following equation (10):

$$\alpha = \alpha_{n-1} + (PL + PHOS) \quad (10)$$

where, PL=proportional part of proportional/integral correction amount at a lean air-fuel ratio.

If the flag AFF1 is not zero, it shows that the air-fuel ratio has just changed from lean to rich. In this case, the controller 2, in a step S12, determines the air-fuel ratio feedback correction coefficient α from the following equation (11).

$$\alpha = \alpha_{n-1} - (PR - PHOS) \quad (11)$$

where, PR=proportional part of proportional/integral correction amount at a rich air-fuel ratio.

As can be understood from equations (10) and (11), increasing the proportional part correction value PHOS in the step S34 of the subroutine of FIG. 3, has the effect of shifting the air-fuel ratio feedback correction coefficient α in the rich direction. Decreasing the proportional part correction value PHOS in the step S35 of the subroutine of FIG. 3, has the effect of shifting the air-fuel ratio feedback correction coefficient α in the lean direction.

After the air-fuel ratio feedback correction coefficient α is determined in the steps S11, S12, S14 or S15, the controller 2, in a step S16, shifts the value of the flag AFF1 into the flag AFF0. After the processing of the step S16, the controller 2 terminates the routine.

The controller 2, by applying the air-fuel ratio feedback correction coefficient α determined in this way to the following equation (12), calculates the pulse width Ti of the pulse signal output to the fuel injector 7.

$$Ti = \{(TP + Kathos)\, Tfbya(\alpha + \alpha m - 1) \cdot 2\} + Ts \qquad (12)$$

where, Tp=basic injection pulse width,

Kathos=transient correction amount,

Tfbya=target equivalence ratio,

αm=air-fuel ratio correction coefficient learning value, and

Ts=ineffectual pulse width.

Equation (12) is known from U.S. Pat. No. 6,148,611. The units of Ti, Tp, Kathos and Ts in equation (12) are milliseconds.

The controller 2 outputs a pulse signal having the pulse width Ti calculated in this way to the fuel injector 7 at the next fuel injection timing of the fuel injector 7.

Figure 7:
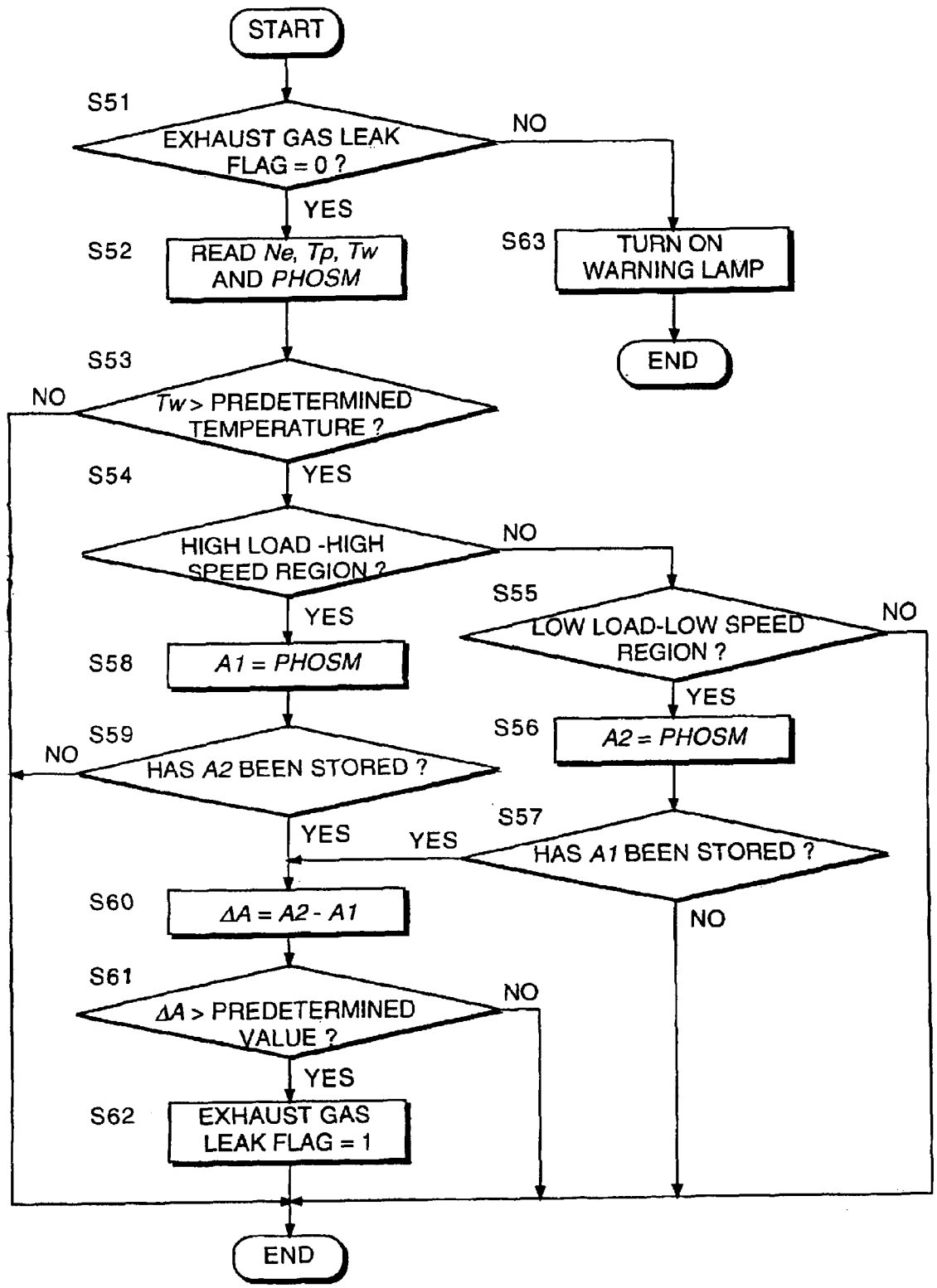
FIG. 7 is a flowchart describing an exhaust leak diagnosis routine performed by the controller.

In relation with the aforementioned air-fuel ratio feedback control, the controller 2 executes the exhaust leak diagnostic routine shown in FIG. 7.

Before describing this routine, the exhaust leak diagnosis algorithm applied by this routine will be described referring to FIGS. 5A–5D, and FIGS. 6A–6D.

When the reciprocal engine 1 operates at low load and low rotation speed, a negative pressure state wherein the exhaust passage 9 is at lower pressure than atmospheric pressure, and a positive pressure state wherein it is at higher pressure than atmospheric pressure, occur alternately. This phenomenon is referred to as exhaust gas pulsation.

If a hole is made in the pipe forming the exhaust passage 9 leading from the exhaust valve 17 of the engine to the catalytic converter 10, when there is a positive pressure in the exhaust passage 9, part of the exhaust gas leaks, and when there is a negative pressure in the exhaust passage 9, atmospheric air is aspirated into the exhaust passage 9.

The atmospheric air aspirated into the exhaust passage 9 when there is a negative pressure in the exhaust passage 9 contains oxygen, and due to this aspiration of atmospheric air, the oxygen concentration of the exhaust gas in the exhaust passage 9 rises. Therefore, by monitoring the variation of the oxygen concentration when there is a negative pressure in the exhaust passage 9, it is possible to diagnose the presence or absence of an exhaust gas leak.

Now referring to FIGS. 5A–5D, assume that, when the engine 1 is running at low load and low rotation speed, an exhaust gas leak consisting of 1% of the total exhaust gas, occurs from the pipe connecting the engine 1 with the three-way catalytic converter 10.

When there is no exhaust gas leak, the air-fuel ratio feedback correction coefficient α repeatedly inverts within a ±5% window around the average value. As a result of this 1% exhaust gas leak, when the oxygen concentration detected by the upstream oxygen sensor 3 rises, the controller 2 determines that the air-fuel ratio of the gaseous mixture has shifted towards lean, and increases the air-fuel ratio feedback correction coefficient α.

If the average value of the air-fuel ratio feedback correction coefficient a when there is no exhaust gas leak is 100%, and the fluctuation width of the feedback correction coefficient α due to feedback control is ±5%, an exhaust gas leak of 1% means that the average value of the air-fuel ratio feedback correction coefficient α increases by 1% to 101%. Due to this increase of the air-fuel ratio feedback correction coefficient α, the air-fuel ratio is maintained in the vicinity of the stoichiometric air-fuel ratio even if there is an exhaust gas leak. However, it is difficult to detect a variation of 1%.

On the other hand, when there is no exhaust gas leak, the proportional part correction value PHOS varies within a range of ±1% relative to the proportional parts PL, PR. After an exhaust gas leak has occurred, as shown in FIG. 5D, the air-fuel ratio feedback correction coefficient α tends to be richer than 100%. Consequently, the addition of DPHOSL in the step S34 of FIG. 3 is repeatedly performed, and as shown in FIG. 5B, the proportional part correction value PHOS continues to increase over a long period of time. If the average value of the proportional part correction value PHOS when there is no exhaust gas leak is zero %, the increase of the proportional part correction value PHOS after there is an exhaust gas leak attains a value of 4% of the proportional parts PL, PR.

In other words, a variation of 1% in the average value of the air-fuel ratio feedback correction coefficient α corresponds to a variation of 4% in the proportional part correction value PHOS.

Here, the resolution of the parameter which detects an exhaust gas leak is defined by the following equation (13).

$$\text{Exhaust gas leak detection resolution} = \frac{\text{parameter fluctuation amount when there is an exhaust gas leak}}{\text{parameter fluctuation amount when there is no exhaust gas leak}} \qquad (13)$$

Taking the air-fuel ratio feedback correction coefficient α as a parameter, the exhaust gas leak detection resolution is 1%/5%, i.e. 20%. Taking the proportional part correction value PHOS as a parameter, the exhaust gas leak detection resolution is 4%/1%, i.e. 400%. Thus, the resolution of the proportional part correction value PHOS is 20 times that of the air-fuel ratio feedback correction coefficient α. The actual increase of resolution depends on the settings of the values of PL, PR, IL, IR, PHPL, PHPR, DPHOSL, DPHOSR applied to the calculation of the air-fuel ratio feedback control coefficient α and proportional part correction value PHOS.

However, it is certain that insofar as regards detection of an exhaust gas leak, the proportional part correction value PHOS has a higher resolution than that of the air-fuel ratio feedback control coefficient α.

Also, the increase of resolution varies according to the running region of the engine 1. For example, when there is no exhaust gas leak, it is still possible that the proportional part correction value PHOS fluctuates largely, as shown in FIG. 5B.

Hence, in this air-fuel ratio feedback controller, exhaust gas leaks are determined based on the proportional part correction value PHOS, two different running regions are set for the engine 1, and the presence or absence of an exhaust gas leak is diagnosed based on the difference between the average values of the proportional part correction value PHOS in the low load region and the high load region.

The running regions of the engine 1 will now be described referring to FIGS. 6A–6D.

Figure 6A:
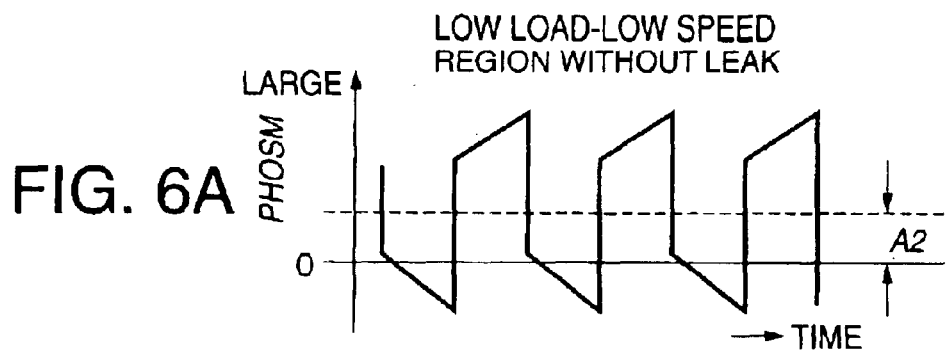
FIGS. 6A–6D are diagrams describing the effects of an exhaust gas leak on the variation of the proportional part correction value PHOS.
Figure 6B:
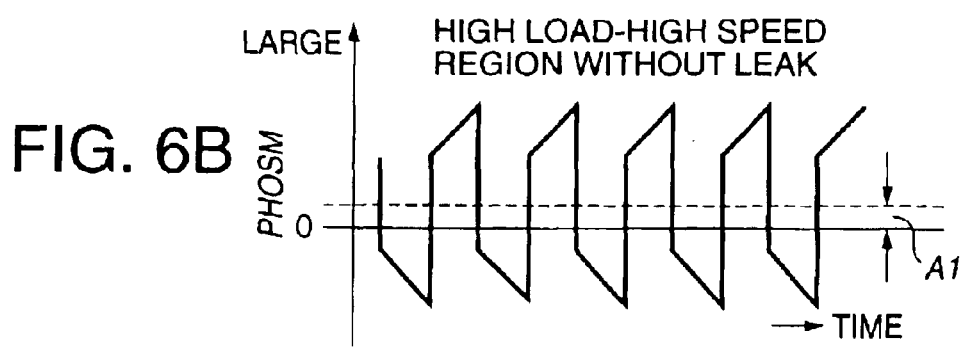
Figure 6C:
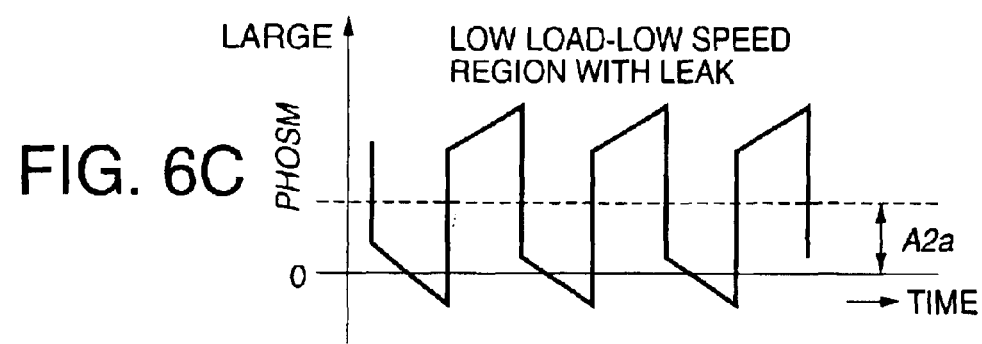

FIGS. 6A, 6C show the variation of the proportional part correction value PHOS when the engine 1 is running in a low load-low rotation speed region.

Figure 6D:
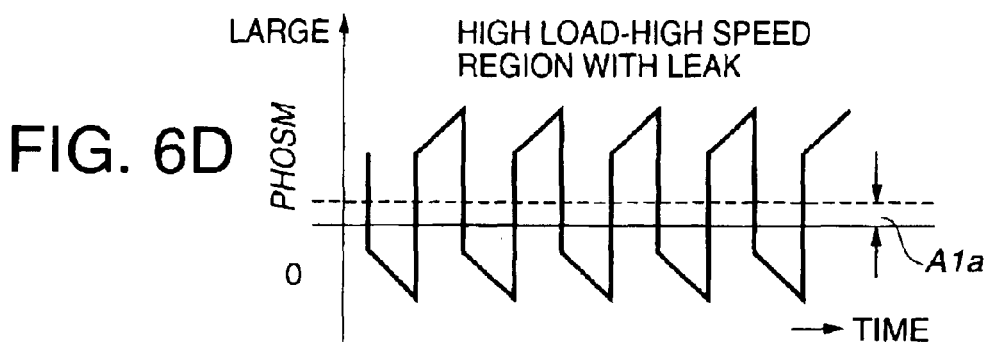

FIGS. 6B, 6D show the variation of the proportional part correction value PHOS when the engine 1 is running in a high load-high rotation speed region.

FIGS. 6A, 6B show of the state where there is no exhaust gas leak, and FIGS. 6C, 6D show the state where there is an exhaust gas leak.

Assume the deviation from zero of the average value of the proportional part correction value PHOS when there is no exhaust gas leak in the low load-low rotation speed region, is A2, as shown in FIG. 6A. Assume the deviation from zero of the average value of the proportional part correction value PHOS when there is no exhaust gas leak in the high load-high rotation speed region, is A1, as shown in FIG. 6B.

It is preferred that these deviations A1, A2 are zero, but in an actual engine, these deviations due to the running region cannot be avoided. When the proportional part correction value PHOS has a positive value, it causes an increase of fuel amount. Therefore, as shown in FIGS. 6A, 6B, when the average value of the proportional part correction value PHOS has a positive value, and air-fuel ratio feedback control is not being performed, it means that the air-fuel ratio has shifted to lean. This state will be referred to as the base air-fuel ratio. The air-fuel ratio may vary from the stoichiometric air-fuel ratio for a number of reasons, e.g., deviation or scatter in the performance of the upstream oxygen sensor 3 and downstream oxygen sensor 13, or time-dependent variations thereof.

When an exhaust gas leak occurs, in the low load-low rotation speed region, the deviation varies towards A2a as shown in FIG. 6C, and in the high load-high rotation speed region, the deviation varies towards A1a, as shown in FIG. 6D.

Here, whereas in the low load-low rotation speed region, the deviation A2a is obviously larger than the deviation A2, in the high load-high rotation speed region, the deviation A1a does not vary much relative to the deviation A1.

This is because, if an exhaust gas leak occurs in the low load-low rotation speed region, as described above, atmospheric air is aspirated into the exhaust passage 9 due to exhaust gas pulsation, so the apparent air-fuel ratio is lean, and in order to return this to the stoichiometric air-fuel ratio, the proportional part correction value PHOS is increased. In the high load-high rotation speed region, even if an exhaust gas leak occurs, the exhaust passage 9 is always at a positive pressure and atmospheric air is not aspirated into the exhaust passage 9, so there is no particular fluctuation of the apparent air-fuel ratio. Here, the apparent air-fuel ratio means the air-fuel ratio determined based on the detection value of the upstream oxygen sensor 3 or the downstream oxygen sensor 13.

Here, comparing the difference A2-A1 between the deviations A2, A1 in the two regions when there is no exhaust gas leak, and the difference A2a-A1a between the deviations A2a, A1a in the two regions when there is an exhaust gas leak, it is clear that the difference A2a-A1a when there is an exhaust gas leak is larger than the difference A2-A1 when there is no exhaust gas leak. Therefore, this air-fuel ratio feedback controller diagnoses the presence or absence of an exhaust gas leak depending on whether or not the difference of the average values of PHOS in the two regions exceeds a predetermined value. According to this diagnostic method, differences in the base air-fuel ratio in the two regions cancel each other out.

Next, referring to the flowchart of FIG. 7, the exhaust gas leak diagnosis routine executed by the controller 2 to diagnose an exhaust gas leak, will be described. This routine is executed at an interval of 100 milliseconds independently of the routines of FIGS. 2–4.

First, in a step S51, the controller 2 determines whether or not an exhaust gas leak flag is zero.

If the exhaust gas leak flag is zero, it shows there is no exhaust gas leak, and if it is unity, it shows there is an exhaust gas leak. The initial value of the exhaust gas leak flag is zero. The setting of the exhaust gas leak flag will be described later. Here, the exhaust gas leak flag set on the immediately preceding occasion the routine was executed, is determined.

If the exhaust gas leak flag is unity, in a step S63, the controller 2 lights a warning lamp provided on the instrument panel of the vehicle. After the processing of the step S63, the controller 2 terminates the routine. Specifically, after the exhaust gas leak flag becomes set to unity, the operation of the step S63 is repeated every time the routine is executed, and the warning lamp remains lit.

If the exhaust gas leak flag is zero, in a step S52, the controller 2 reads the engine rotation speed Ne, basic fuel injection pulse width Tp, cooling water temperature Tw and average value PHOSM. The basic fuel injection pulse width Tp is a value used for the injection of the fuel injector 7 immediately prior to executing the routine. The average value PHOSM is the average value PHOS of the proportional part correction value PHOS calculated by the subroutine of FIG. 3 immediately prior to executing the routine.

In a following step S53, the controller 2 compares the cooling water temperature Tw with a predetermined temperature. This processing is performed to determine whether or not warm-up of the engine 1 is complete. If the cooling water temperature Tw does not exceed the predetermined temperature, the routine is immediately terminated.

If the cooling water temperature Tw is higher than the predetermined temperature, in a step S54, the controller 2 determines whether or not the running region of the engine 1 corresponds to a predetermined high load-high rotation speed region based on the basic injection pulse width Tp and engine rotation speed Ne.

If the determination result of the step S54 is negative, the controller 2, in a step S55, determines whether or not the running region of the engine 1 corresponds to a low load-low rotation speed region based on the basic pulse width Tp and engine rotation speed Ne.

If the determination result of the step S55 is negative, the controller 2 immediately terminates the routine.

If the determination result of the step S55 is affirmative, the controller 2, in a step S56, stores the average value PHOSM as the average value A2 of the proportional part correction value PHOS in the low load-low rotation speed region, in its memory. In a following step S57, the controller 2 determines whether or not the average value A1 of the proportional part correction value PHOS in the high load-high rotation speed region, has already been stored in the memory.

A1, A2 are initialized on the first occasion the routine is executed. Therefore, after the engine 1 starts, when the determination of the step S57 is performed for the first time, the average value A1 is not stored in the memory. If the average value A1 is not stored in the memory, the controller 2 immediately terminates the routine. After the engine 1 starts, if it continues to run in the low load-low rotation speed region, the processing of the steps S51–S57 is repeated, and only the average value A2 is updated.

Now, if the determination result of the step S54 is affirmative, in a step S58, the controller 2 stores the average value PHOSM in the memory as the average value A1 of the proportional part correction value PHOS in the high load-high rotation speed region. In a following step S59, the controller 2 determines whether or not the average value A2 of the proportional part correction value PHOS in the low load-low rotation speed region, has already been stored in the memory.

If the determination result of the step S59 is negative, the controller 2 immediately terminates the routine.

If the determination result of the step S59 is affirmative, in a step S60, the controller 2 stores a difference ΔA between the average values A2, A1 stored in the memory. When the determination result of the step S57 was affirmative, the controller 2 also calculates the difference ΔA in the step S60.

In a following step S61, the controller 2 compares the difference ΔA with a predetermined value. The predetermined value is set to 4% of the proportional part PR (PL).

If the difference ΔA is larger than the predetermined value, in a step S62, the controller 2 sets the exhaust gas leak flag to unity. After the processing of the step S62, the controller 2 terminates the routine.

If the difference ΔA is not larger than the predetermined value, the controller 2 immediately terminates the routine.

As described above, this invention determines the presence or absence of an exhaust gas leak to a high determination precision based on the proportional part correction value PHOS regardless of the air-fuel ratio feedback correction coefficient α.

Further, the presence or absence of an exhaust gas leak is determined based on the difference in the average value PHOSM in the low load-low rotation speed region and high load-high rotation speed region, so the absence or presence of an exhaust gas leak can be determined to a high precision without being affected by discrepancies in the base air-fuel ratio in the two regions.

The contents of Tokugan 2002-008515, with a filing date of Jan. 17, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

Figure 8A:
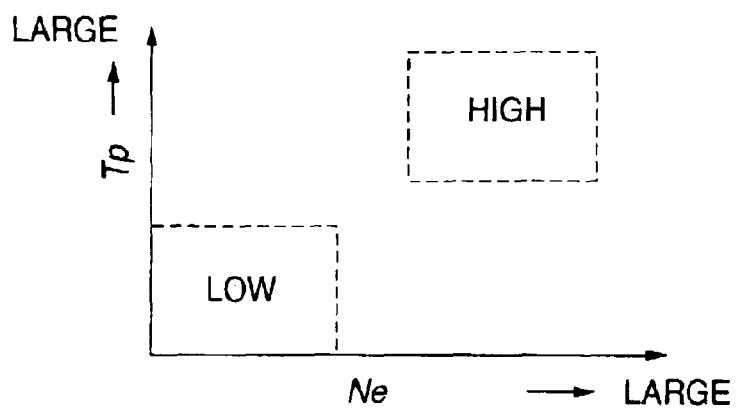
FIGS. 8A–8C are diagrams describing various running regions of the engine which the controller discriminates.
Figure 8B:
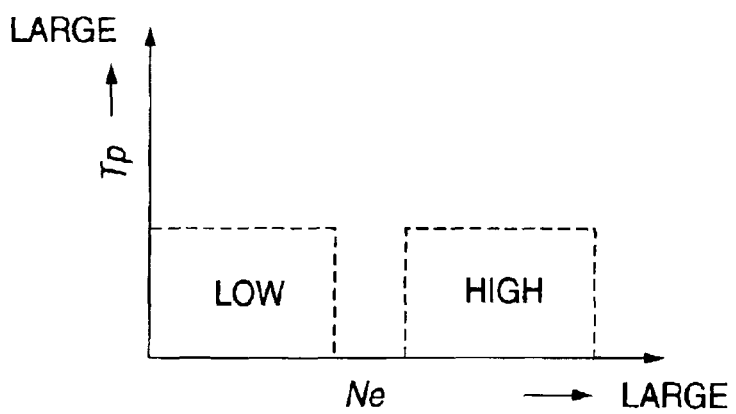
Figure 8C:
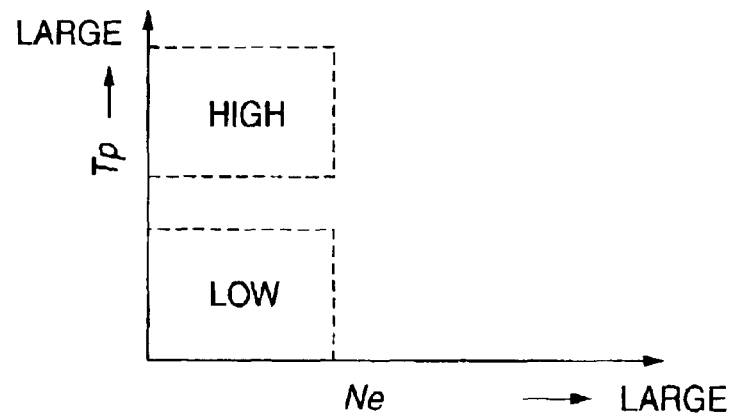

For example, according to this embodiment, as shown in FIG. 8A, the two running regions of the engine 1 used to calculate the difference in the average value PHOSM are set based on the basic fuel injection pulse width Tp and engine rotation speed Ne. However, the case where the two regions are set based only on the engine rotation speed Ne as shown in FIG. 8B, and the case where the two regions are set based only on the basic fuel injection pulse width Tp as shown in FIG. 8C, are also within the scope of this invention.

Instead of determining the presence or absence of an exhaust gas leak based on the difference ΔA between the values A2, A1 in the two regions, the presence or absence of an exhaust gas leak may of course be determined based on the value A2 in the low load-low rotation speed region alone. In this case, it is determined that there is an exhaust gas leak when A2 exceeds a predetermined deviation. If the determination based on the difference ΔA is Case #1, and the determination based only on A2 is Case #2, Case #1 and Case #2 have the following advantages and disadvantages.

Even in Case #2, the diagnosis can be performed with higher precision than in the case where the presence or absence of an exhaust gas leak were determined based on the air-fuel ratio feedback correction coefficient α. However, as the difference in the base air-fuel ratio due to the running region cannot be compensated, it has a lower diagnostic precision than Case #1. In Case #1, the difference in the base air-fuel ratio can be compensated, so the highest diagnostic precision is obtained.

In Case #1, the engine 1 must be run in two running regions, so exhaust gas leak diagnosis cannot be made until this condition is satisfied. In Case #2, an exhaust gas leak diagnosis can be made provided that the engine 1 has been run at least in the low load-low engine speed region.

Instead of using the basic fuel injection pulse width Tp as a parameter for setting the two regions, it is also preferred to use the intake air flowrate Qas of the engine 1 detected by the air flow meter 6. The effect of an exhaust gas leak on the apparent air-fuel ratio depends largely on the exhaust gas flowrate. The intake air flowrate Qas may be considered equivalent to the exhaust gas flowrate. If the intake air flowrate Qas is large, the apparent air-fuel ratio does not vary much even if there is an exhaust gas leak, whereas if the intake air flowrate Qas is small, an exhaust gas leak has a large effect on the apparent air-fuel ratio variation.

In the above embodiment, the proportional parts PR, PL were corrected by the correction value PHOS as values representing basic control constants to perform air-fuel ratio feedback control, but the basic control constants to perform air-fuel ratio feedback control are not limited the proportional parts PR, PL. For example, the basic control constants other than the proportional parts PR, PL are the integral parts IR, IL, the response delay time of the upstream oxygen sensor 3 and the slice level SLF used in the step S4. It is still within the scope of this invention to modify these values according to the output of the downstream oxygen sensor 13, and perform an exhaust gas leak diagnosis based on the modified values.

Further, in the routine of FIG. 7, once the exhaust gas leak flag has been set to unity, the warning lamp automatically remains lit without performing an exhaust gas leak diagnosis, however an exhaust gas leak diagnosis can be made even when the exhaust gas leak flag is unity, and the warning lamp turned on or off according to the result thereof.

The embodiments of this invention in which an exclusive property or privilege is claimed are defined as follows:

What is claimed is:

1. An air-fuel ratio control method for an internal combustion engine, the engine burning an air-fuel mixture of air and fuel injected from a fuel injector and discharging combustion gas from an exhaust passage through a three-way catalytic converter, the method comprising:

detecting an oxygen concentration of the exhaust passage upstream of the three-way catalytic converter;

detecting an oxygen concentration of the exhaust passage downstream of the three-way catalytic converter;

detecting a running region of the engine;

calculating a correction value based on the oxygen concentration of the exhaust passage downstream of the three-way catalytic converter;

correcting a preset basic control constant by the correction value as a corrected basic control constant;

feedback controlling a fuel injection amount of the fuel injector based on the oxygen concentration of the exhaust passage upstream of the three-way catalytic converter and the corrected basic control constant to cause an air-fuel ratio of the air-fuel mixture to be equal to a stoichiometric air-fuel ratio; and determining that there is an exhaust gas leak in the exhaust passage upstream of the three-way catalytic converter when a difference of the correction values under different running regions exceeds a predetermined value.

2. An air-fuel ratio control device for an internal combustion engine, the engine burning an air-fuel mixture of air and fuel injected from a fuel injector and discharging combustion gas from an exhaust passage through a three-way catalytic converter, the device comprising:

an upstream oxygen sensor means which detects an oxygen concentration of the exhaust passage upstream of the three-way catalytic converter;

a downstream oxygen sensor means which detects an oxygen concentration of the exhaust passage downstream of the three-way catalytic converter;

a sensor means which detects a running region of the engine;

a calculating means which calculates a correction value based on the oxygen concentration detected by the downstream oxygen sensor means;

a correcting means which corrects a preset basic control constant by the correction value as a corrected basic control constant;

a feedback control means which feedback controls a fuel injection amount of the fuel injector based on the oxygen concentration detected by the upstream oxygen sensor means and the corrected basic control constant to cause an air-fuel ratio of the air-fuel mixture to be equal to a stoichiometric air-fuel ratio; and a determining means for determining that there is an exhaust gas leak in the exhaust passage upstream of the three-way catalytic converter when a difference of the correction values under different running regions exceeds a predetermined value.

3. An air-fuel ratio control device for an internal combustion engine, the engine burning an air-fuel mixture of air and fuel injected from a fuel injector and discharging combustion gas from an exhaust passage through a three-way catalytic converter, the device comprising:

an upstream oxygen sensor which detects an oxygen concentration of the exhaust passage upstream of the three-way catalytic converter;

a downstream oxygen sensor which detects an oxygen concentration of the exhaust passage downstream of the three-way catalytic converter;

a sensor which detects a running region of the engine; and a controller functioning to:

calculate a correction value based on the oxygen concentration detected by the downstream oxygen sensor;

correct a preset basic control constant by the correction value as a corrected basic control constant;

feedback control a fuel injection amount of the fuel injector based on the oxygen concentration detected by the upstream oxygen sensor and the corrected basic control constant to cause an air-fuel ratio of the air-fuel mixture to be equal to a stoichiometric air-fuel ratio; and determine that there is an exhaust gas leak in the exhaust passage upstream of the three-way catalytic converter when a difference of the correction values under different running regions exceeds a predetermined value.

4. The air-fuel ratio control device as defined in claim 3, wherein the running region detecting sensor comprises a sensor which detects a rotation speed of the engine, and the controller further functions to identify the two running regions as a first region specified by the rotation speed, and a second region wherein the rotation speed is lower than the rotation speed of the first region.

5. The air-fuel ratio control device as defined in claim 3, wherein the running region detecting sensor comprises a sensor which detects an intake air flowrate of the engine, and the controller further functions to identify the two running regions as a first region specified by the intake air flowrate, and a second region wherein the intake air flowrate is less than the intake air flowrate of the first region.

6. The air-fuel ratio control device as defined in claim 3, wherein the running region detecting sensor comprises a sensor which detects a rotation speed of the engine and a sensor which detects an intake air flowrate of the engine, and the controller further functions to identify the two running regions as a first region specified by the rotation speed and an engine load calculated from the intake air flowrate, and a second region wherein the engine load is smaller than the engine load of the first region and the rotation speed is lower than the rotation speed of the first region.

7. The air-fuel ratio control device as defined in claim 3, wherein the device further comprises a sensor which distinguishes whether or not warm-up of the engine is complete, and the controller further functions not to determine whether or not there is an exhaust gas leak as long as warm-up of the engine is not complete.

8. The air-fuel ratio control device as defined in claim 3, wherein the controller further functions to respectively calculate average values of the correction values in the two different running regions, and determine that there is an exhaust gas leak when the difference between the average values exceeds a predetermined value.

9. The air-fuel ratio control device as defined in claim 3, wherein the controller further functions to calculate an air-fuel ratio feedback correction coefficient by applying proportional/integral control based on the oxygen concentration detected by the upstream oxygen sensor, determine the fuel injection amount of the fuel injector according to the air-fuel ratio feedback correction coefficient, and correct a proportional part of the proportional/integral control, as the basic control constant, by the correction value.

10. The air-fuel ratio control device as defined in claim 9, wherein the controller further functions to correct the correction value in an increasing direction of the fuel injection amount when the oxygen concentration detected by the downstream oxygen sensor is a value corresponding to a lean air-fuel ratio, and correct the correction value in a decreasing direction of the fuel injection amount when the oxygen concentration detected by the downstream oxygen sensor is a value corresponding to a rich air-fuel ratio.

* * * * *